Feb. 10, 1953 C. H. APEL 2,627,897
RAILWAY VEHICLE OPERATOR'S SEAT
Filed Oct. 3, 1946 4 Sheets-Sheet 1
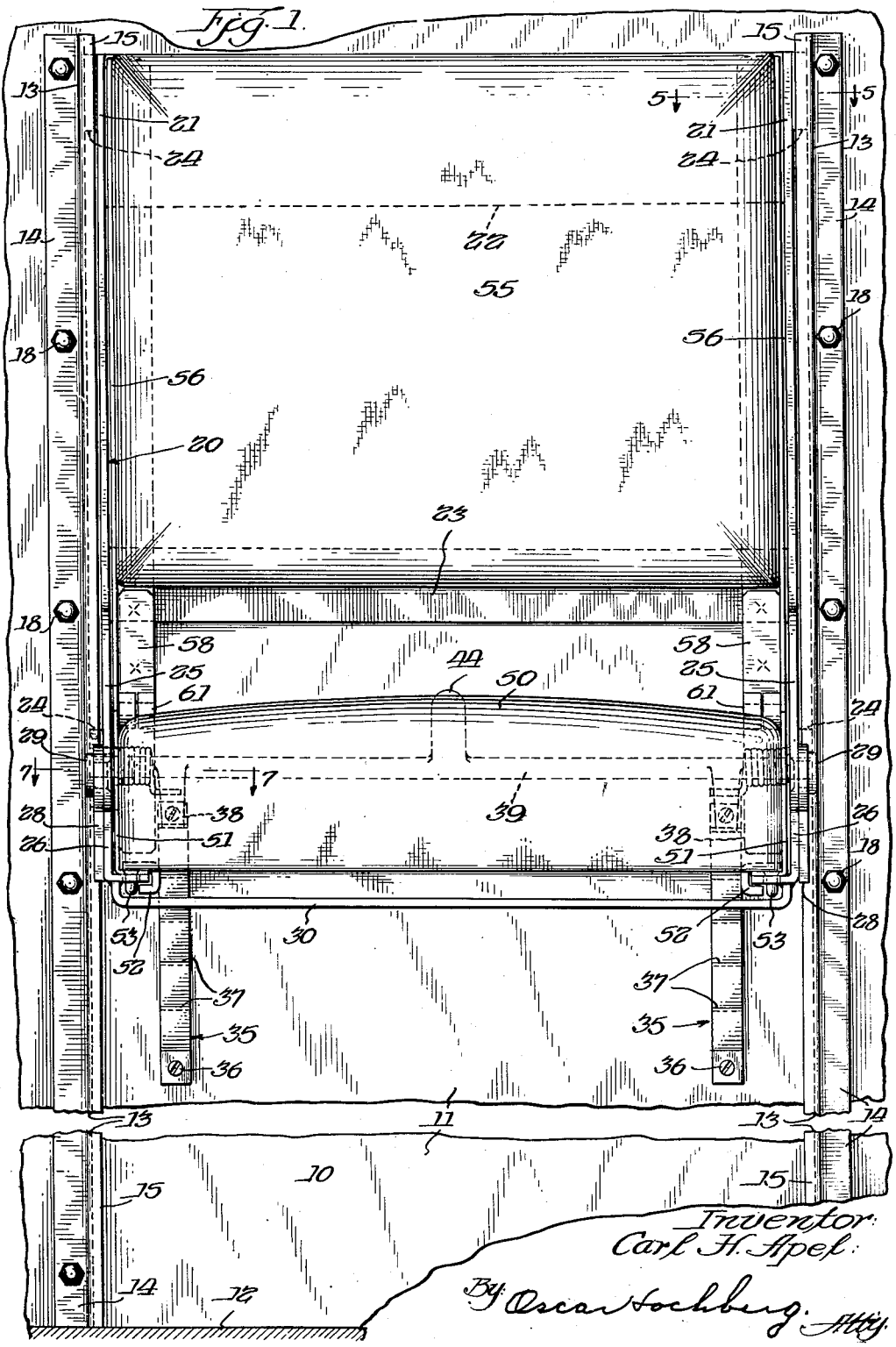
Inventor:
Carl H. Apel
By Oscar Hochberg Atty.

Feb. 10, 1953 C. H. APEL 2,627,897
RAILWAY VEHICLE OPERATOR'S SEAT
Filed Oct. 3, 1946 4 Sheets-Sheet 2
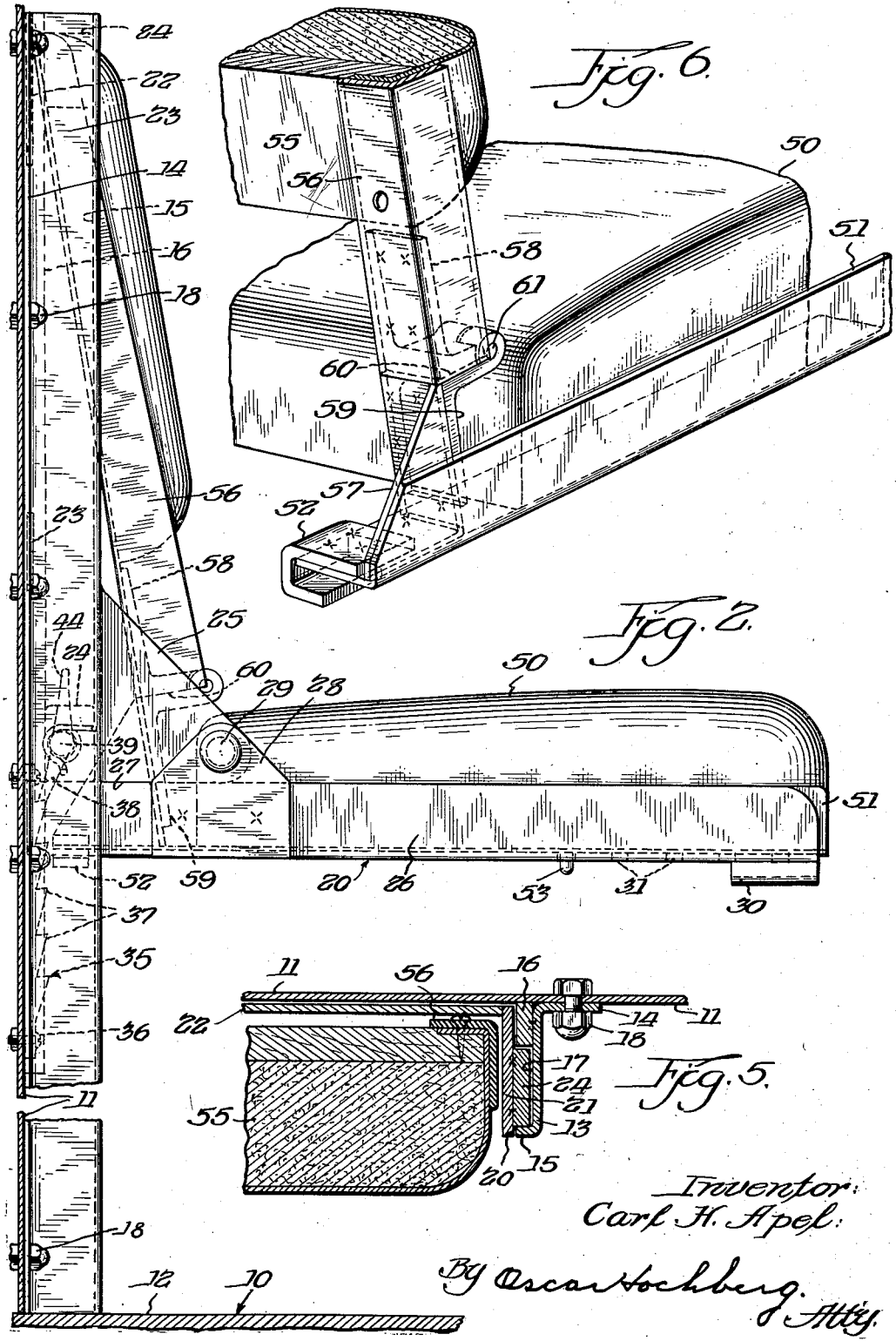
Inventor:
Carl H. Apel
By Oscar Hochberg
Atty.

Feb. 10, 1953 C. H. APEL 2,627,897
RAILWAY VEHICLE OPERATOR'S SEAT
Filed Oct. 3, 1946 4 Sheets-Sheet 3
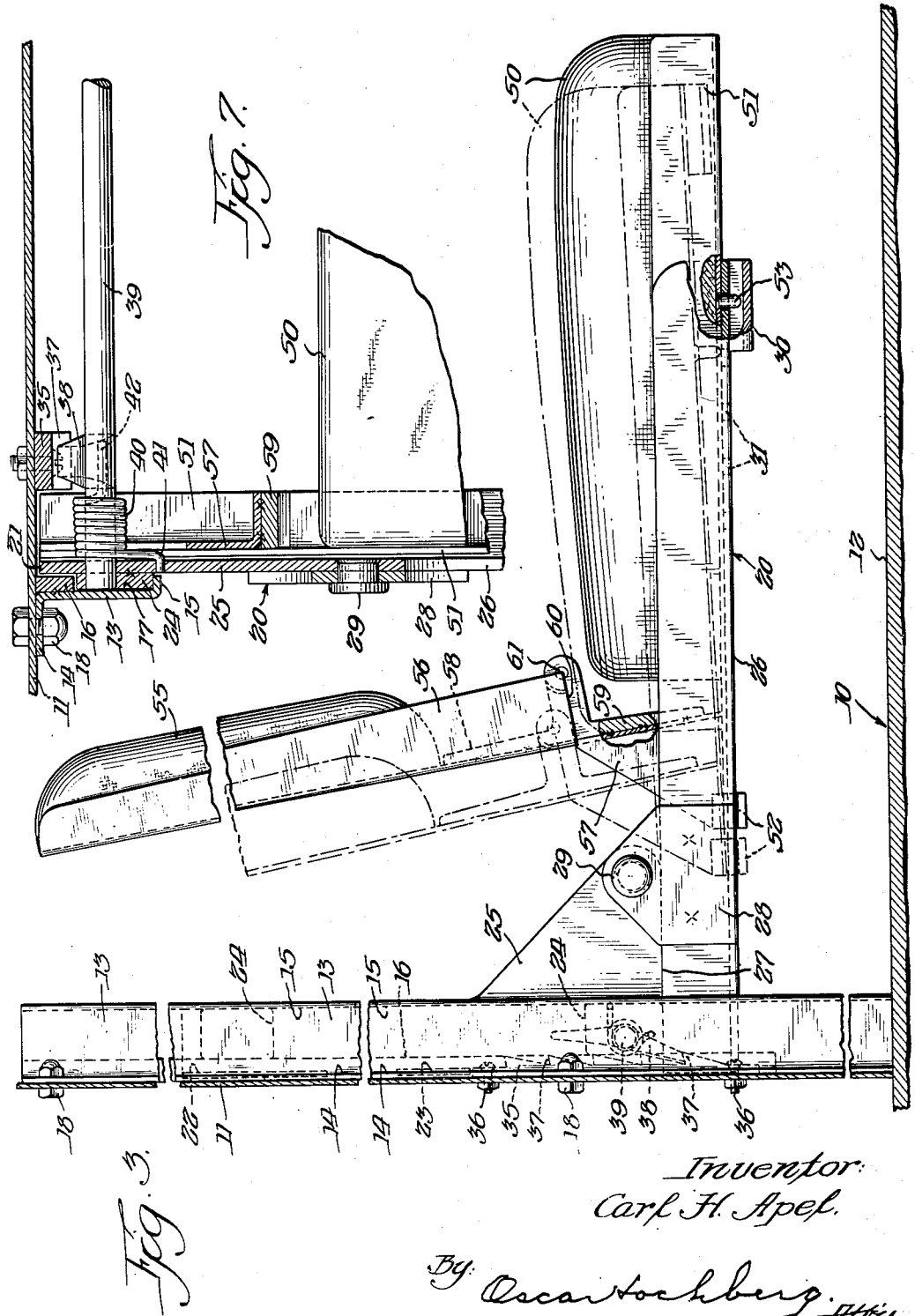
Inventor
Carl H. Apel.
By Oscar Hochberg, Atty.

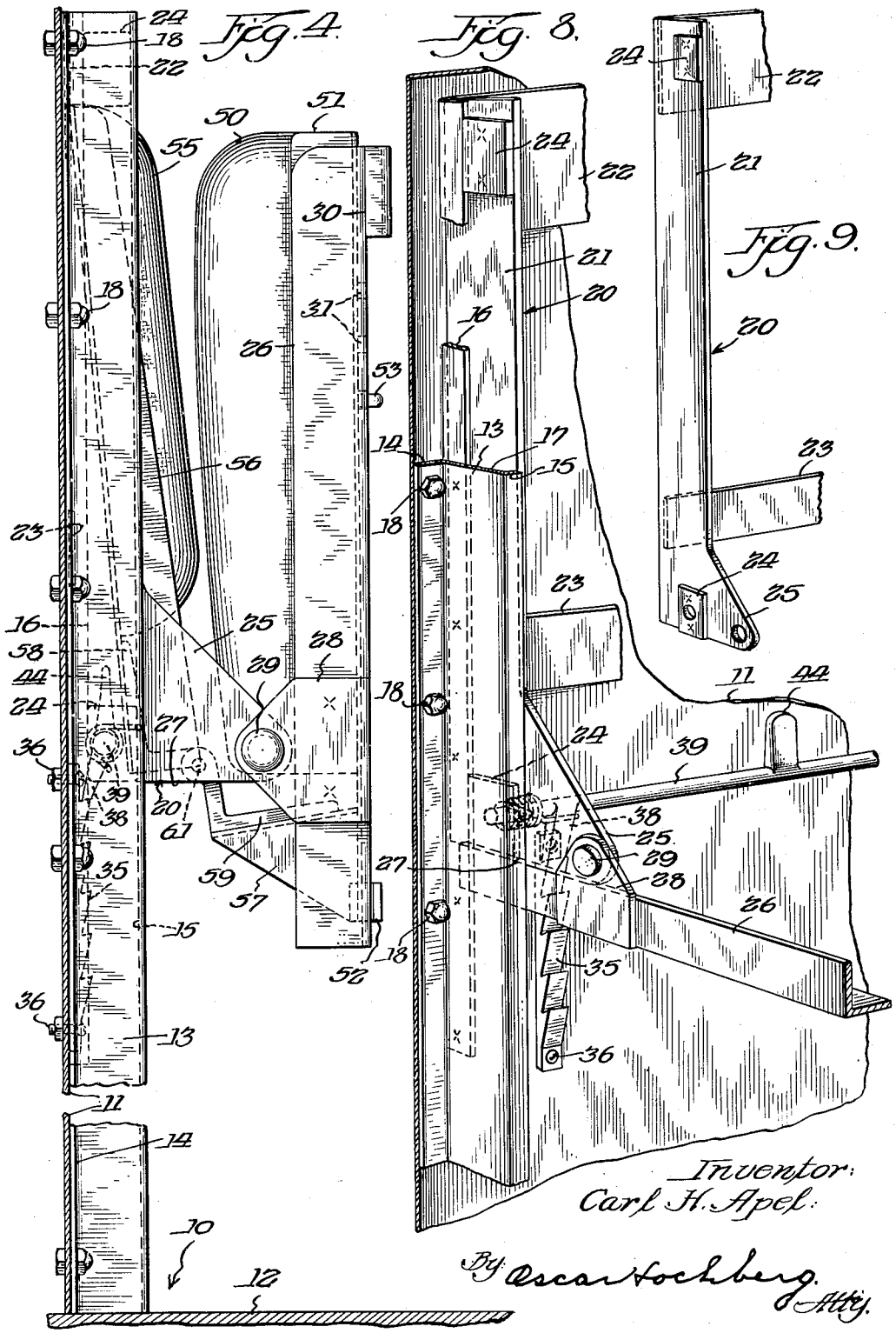

UNITED STATES PATENT OFFICE 2,627,897

RAILWAY VEHICLE OPERATOR'S SEAT

Carl H. Apel, Chicago, Ill., assignor to Pullman-Standard Car Manufacturing Company, Chicago, Ill., a corporation of Delaware Application October 3, 1946, Serial No. 700,935

9 Claims. (Cl. 155—82)

This invention relates to a motorman's seat for railway vehicles and has for its primary purpose the provision of such a seat, which, in addition to being adjustable vertically, to regulate the height of the seat, is adjustable horizontally in a forwardly and rearwardly direction to locate the position of the seat with respect to the vehicle controls in accordance with the proportions of the operator.

The principal object of the invention is the provision of a motorman's seat which may be adjusted vertically and horizontally and which is foldable to an inoperative position out of the way when the seat is not in use or when it is desired to use the motorman's compartment as a guard station.

An important object of the invention is to provide a motorman's seat which is adjustable vertically and horizontally and foldable to an inoperative position, which is of simple but rugged design, readily assembled and easily maintained in service.

More specifically, the invention contemplates a motorman's seat having a vertically adjustable supporting frame slidably mounted in supporting columns and including relative foldable seat supporting portions upon which the seat proper is adjustably mounted for horizontal movement relative thereto, with the seat cushion pivotally connected to a backrest for folding movements with the seat supporting frame portions.

The foregoing and other objects are attained by the seat arrangement illustrated in the accompanying drawings, in which—

Fig. 1 is a front elevational view of a motorman's seat constructed and mounted in accordance with this invention and showing the seat adjustably supported on ratchet mechanism between the vertical guide columns secured to a cab wall with the pawl members connected by a continuous operating rod;

Fig. 2 is a side elevational view of the seat arrangement showing the seat adjusted to its upper and rearmost position, with the pawl members engaged in the uppermost ratchet teeth and the seat adjusting pins engaged in the rearmost holes in the seat supporting frame;

Fig. 3 also is a side elevational view of the seat arrangement, similar to Fig. 2 but illustrating the seat as adjusted to its lower and foremost position, with the pawl members engaged in the lowermost ratchet teeth and the seat adjusting pins engaged in the foremost holes in the supporting frame, and indicating in broken lines the manner of adjusting the longitudinal position of the seat, with the adjusting pins on the seat frame lifted clear of the adjustment holes in the seat supporting frame ready for sliding movement, guided by the slide members at the rear of the seat frame, to any of the adjusted positions represented by the various holes in the supporting frame;

Fig. 4 also is a side elevational view of the seat arrangement, but showing the seat in folded inoperative position, in which condition the seat supporting frame may be in any one of the vertically adjusted positions of the ratchet mechanism without affecting the folding action of the seat, and clearly revealing the pivotal connection between the vertical and horizontal portions of the seat supporting frame and that between the seat cushion and backrest;

Fig. 5, on Sheet 2, is a fragmentary detail sectional view taken on the line 5—5 of Fig. 1 showing the relation of the vertically slidable seat supporting frame in one of the upright stiles secured to a partition of the motorman's compartment with the backrest nested between the vertical side portions of the frame;

Fig. 6, also on Sheet 2, is a detail perspective view of the hinge connection between the seat and backrest showing a portion of the seat frame with the seat cushion thereon and one of the slides at the rear end thereof for guiding the seat on the supporting frame, with an upright angle bracket for supporting one of the hinge butts, and the other portion of the hinge secured to the angle frame supporting the backrest;

Fig. 7, on Sheet 3, is a detail view in plan showing the spring actuated pawl mechanism for adjusting and supporting the seat in various vertical positions, with the actuating rod journaled in the supporting frame and a spring coiled about the rod with one end anchored in the frame and the other bearing against the pawl to press it into engagement with the ratchet;

Fig. 8, on Sheet 4, is a detail perspective view with portions broken away showing the foldable seat supporting frame slidably mounted in the upright stile providing a track therefor, with the adjustable ratchet mechanism for supporting the frame; and Fig. 9, also on Sheet 4, is a detail perspective view with portions broken away illustrating one of the upright portions of the seat supporting frame, having provision at the lower end for pivotal connection with the horizontal seat supporting portion and showing the guide members, top and bottom, adapted to be engaged in the track portions of the vertical stile members.

A seat arrangement of the kind contemplated by this invention is used in that type of railway vehicle utilized in what is known as "rapid transit" service, and comprises a seat for the operator or motorman of the vehicle or train and which is mounted upon a partition in a compartment or cab provided for the motorman and foldable against the partition when not in use, at which time the compartment may be used as a guard's station. The present seat, in addition to being foldable to an inoperative position against the cab wall, also is adjustable both vertically and horizontally in a longitudinal direction to regulate the position of the seat with respect to the vehicle controls to that most comfortable and convenient for the motorman.

In the drawings, 10 represents a motorman's compartment having a rear partition wall 11 and a floor 12. The partition wall extends transversely of the vehicle and full height thereof, and separates the motorman's cab from the passenger compartment of the vehicle. The motorman's seat is adapted for mounting upon this partition at one side of the vehicle, facing in a longitudinal direction toward the end of the vehicle. A pair of vertical stile members 13 are secured to the partition 11, in spaced relation, to provide opposed tracks in which the seat arrangement is adapted to ride up and down for vertical adjustment. The stiles comprise Z-shaped members having outwardly directed flanges 14 for attachment to the cab partition, and inwardly directed outer flanges 15 for guiding the vertical movements of the seat. A vertical strip 16, secured to the web of each of the Z-shaped stiles at the rear thereof, defines a trackway 17 in each of the members in which the seat supporting frame is adapted to ride between the flanges 15 and the strips 16. The Z-shaped upright track members are secured to the partition by means of bolts 18 which are removable for ease of assembly and maintenance.

The spaced apart vertical track members 13 are adapted to receive between them a vertically reciprocable seat supporting frame 20 which is arranged to ride in the trackway 17. This seat supporting frame includes upright members 21 connected by upper and lower cross members 22 and 23, and disposed closely adjacent and in opposed relation to the respective track members 17. This upright portion comprises a rigid rectangular frame by reason of the connection between the two uprights 21 of the cross members 22 and 23, which are secured by welding, thus creating an integral and inflexible frame fitting immediately between the stiles 13. The upright frame members 21 on their respective outer surfaces are provided with spaced slide blocks 24 located at the upper and lower ends of the frame members and projecting into the trackway 17 in the respectively opposed stiles 13 to guide the vertical movements of the frame as it is moved up and down for adjustment of the seat. The slide blocks, as shown, are secured to the members 21 by welding, and thus function as an integral part of the supporting frame in operation.

The seat supporting frame also is provided with a relatively folding horizontal portion which is carried by and pivotally connected to the upright portions 21. At their respective lower ends, the members 21 are each provided with a forwardly projecting lug 25 to which the horizontal frame portions are adapted to be pivotally connected. The horizontal folding portion of the seat supporting frame comprises a pair of angle members 26 having their respective vertical flanges disposed in vertical alignment with the upright side members 21 and the upper edges of the flanges disposed directly in abutting relation to the bottom surfaces of the side members and the projecting lugs 25 as at 27. The seat support angles 26 are pivoted to the lugs 25 by means of brackets 28 secured by welding to the outer surface of the angles and projecting upwardly above the angle members alongside of the lugs 25 to which they are pivotally connected by pins 29. The angle members 26 are connected together at their forward ends by means of a flat plate 30 having upturned ends welded to the respective angles to provide a rigid, properly squared structure and insure joint and simultaneous folding operations of angle members 26 about the pivots 29. The horizontal flanges of the angular members are directed inwardly to support the seat structure hereinafter to be described between the vertical flanges thereof, and a series of aligned holes 31 are provided in each of the horizontal flanges for adjustment of the seat in a plurality of positions longitudinally, as more fully hereinafter to be revealed. Thus it will be seen that a seat supporting structure has been provided which is vertically reciprocable in the tracks 17 and in which the relatively foldable horizontal portion is pivotally supported from the upright portion 21 and maintained in horizontal position by the abutting engagement of the vertical flanges of the angle members 26 with the bottom edge of members 21, as at 27, which engagement being beyond the fulcrum point 29 will positively prevent further pivoting downwardly of the angle members 26 once the abutting engagement is had.

The vertical position of the seat supporting frame is regulated by means of pawl and ratchet mechanism adapted to support the frame in any one of a plurality of positions representing various heights from the vehicle floor 12. For this purpose, a pair of ratchet members 35 are secured, by means of bolts 36, to the partition 11 in spaced relation such as to be disposed adjacent to the respective frame members 26 but out of the plane of operation of those members in vertical directions, as best shown in Fig. 1. The ratchet members are each provided with a plurality of teeth 37 disposed at varying heights from the floor 12, whereby when engaged, to maintain the seat supporting frame at corresponding adjustments. Pawl members 38 are provided on the seat support frame in positions for releasably engaging the respective ratchets and, in the form shown, are constructed integrally with an operating rod 39 extending continuously between the uprights 21. As best shown in Fig. 7, the operating rod is journaled at respectively opposite ends in the upright members 21, and the location of the rod is such that the bearing area afforded by these frame members is supplemented by the slide blocks 24 which are disposed at this point and into which the ends of the operating rod also extend. The pawls are pressed into engagement with the ratchets by means of torsionally operating springs 40 coiled about the shaft 39 at opposite ends and anchored in the respective members 21, as indicated at 41, with the other end of the spring engaging the adjacent pawl as at 42, thereby to exert their force in a direction keeping the pawls engaged in the ratchet teeth 37. When it is desired to lower the seat supporting frame, the pawls 38 may be disengaged from the ratchets 35 by merely rotating the shaft 39 in a direction to retract the pawls from the teeth 37, and to facilitate this operation, the shaft is provided with an upstanding actuating handle 44 located substantially at the center thereof, so that by merely pressing on the handle, the shaft will be rotated in a direction to remove the pawls from the ratchet teeth, whereupon the support for the seat is withdrawn and it may be lowered to the adjustment desired. When pawls are adjusted to a lower position and it is desired to raise the level of the seat supporting frame, it is necessary merely to lift the frame without the necessity for releasing the pawls, which will automatically engage successive teeth in the ratchets under influence of springs 40 as the frame is raised until the vertical adjustment desired is reached. It is to be noted that when lowering the seat supporting frame, if the pawls are held in released position until they have passed below the level of the lowermost supporting teeth 37 of the ratchet members, the frame will be supported and prevented from dropping to the floor by reason of the cross member 23 of the frame coming in contact with the ratchet members 35, as will best be seen in Fig. 3, whereby positively to prevent the pawl mechanism from being lowered beyond the range of the ratchet teeth. While the upright stile members 13, in which the seat supporting frame is slidable up and down, are shown open at their upper ends in the embodiment illustrated, in actual practice these members are disposed immediately beneath an electric locker cabinet mounted upon the cab partition 11, which closes the upper ends of the stiles and thus precludes any possibility of the frame being lifted high enough to raise the slide blocks 24 out of the guiding trackways 17. If desired, or in other circumstances, the tops of the stiles themselves may be closed off by flanging over or by welding a plate over the top thereof to close the upper ends of the tracks 17.

It will be seen that any seat structure carried by the seat supporting frame arrangement described will be adjustable in a vertical direction to the plurality of positions afforded by the ratchet mechanism. The seat structure herein provided includes a seat cushion 50 which is mounted in a pair of seat frame angle members 51, rigidly secured thereto at respectively opposite sides. The angle members 51 each extend continuously from the front edge of the seat cushion to a point beyond the rear edge of the cushion and are maintained in parallelism by the seat cushion structure. This structure, including the angles 51, is slidably supported in the angle members 26 of the seat supporting frame on the horizontal flanges thereof and confined between the vertical flanges. Each seat frame angle 51 has a guide member 52 secured thereto at the rear end which is shaped to embrace the horizontal flange of the respective angles 26 so that as the seat frame is slid along the supporting angles, relative vertical displacement will be prevented. Each angle 51 also has a depending pin member 53 on its underside, adapted to be inserted through one of the adjustment openings 31 in the support angles 26 to maintain the horizontally adjusted position of the seat in any one of the plurality of positions afforded by the holes 31. As best shown in Fig. 3, this horizontal adjustment of the seat is accomplished by lifting the forward edge of the seat cushion to raise the pins 53 out of the holes 31, and sliding the seat in the supporting angles 26 to the position desired and then again engaging the depending pins in the adjustment holes required. The guide members 52 maintain normal sliding relationship with the inwardly directed flanges of the angles 26 during this operation. It will be noted that the plate 30 connecting the angles 26 at their forward ends is offset downwardly to provide clearance for the pins 53 and for the guides 52 during assembly, as best shown in Fig. 1.

The seat cushion 50 may be provided with a backrest which is foldable relative thereto and which is movable therewith during horizontal adjustment. The backrest is positively supported from the seat frame angles 51 but is hingedly connected thereto for relative folding movements. This hinged connection is best illustrated in Fig. 6. The backrest cushion 55 is mounted on a pair of upright angle members 56 rigidly secured thereto at respectively opposite sides, and these angle members extend below the backrest for connection with the hinge members. This hinge connection at each side of the frame is made between the lower end of the respective angle member 56, and an upright angle-shaped hinge bracket 57 secured by welding to the respective seat frame angle 51. One flange of the bracket 57 at each side of the seat is directed rearwardly and is disposed in adjoining relation to the upwardly directed flange of the seat frame angle 51 to which it is welded, and the other flange is directed inwardly in the same plane as the inwardly directed flange of the angle 56 secured at each side of the backrest. The other flanges of the respective angles 56 are directed forwardly to embrace the backrest cushion between the two of them. The hinge connection for the backrest is had directly at the joint between the brackets 57 and the upright angles 56, and the hinges are so constructed as to comprise the sole support maintaining the backrest in upright position against the load imposed thereon by a person occupying the seat. To obtain this support, the hinges are offset to place the hinge axis at a point spaced forwardly of the inwardly directed flanges of the angles 56 and brackets 57 so as to provide horizontal abutting surfaces between the hinge members to limit the pivotal action thereof. The hinge members are secured to the inwardly directed flanges of the angles 56 and brackets 57 at the forward side thereof by welding, and comprising L-shaped hinge butts 58 and 59 secured in opposed relation to the members 56 and 57 respectively. The respective vertical leg portions of the hinge members comprise the attaching portions, and the horizontal leg portions are disposed in back-to-back abutting relation, as at 60. The hinge axis 61 is located at the foremost extremity of the horizontal leg portions so that the hinging action can be had only in a forward direction, and the abutting joint 60 will support the backrest in upright operative position. By this arrangement it will readily be seen that while the backrest is capable of being folded forwardly about the hinge point 61, it will be positively supported in its normal upright position by reason of the abutting surfaces 60, and by reason of the hinged nature of the seat supporting frame members 26, the seat as a whole, including the backrest and seat cushion, may be folded to an inoperative position against the cab wall 11 merely by lifting the seat cushion through the medium of the cross member 30, and regardless of whether the backrest is disposed in upright position or folded over the seat cushion.

By the foregoing construction, the invention provides a seat for the operator of a rail vehicle which is capable of being readily adjusted to a plurality of positions, both vertically and horizontally, and which may be folded to an inoperative position, and which is of simple but rugged construction and easily operated.

What is claimed is:

1. An adjustable and folding seat for rail vehicles comprising a pair of spaced columns secured to the vehicle and having vertical tracks providing guideways, a seat supporting frame including a pair of uprights disposed adjacent to said columns and having guide blocks projecting into said guideways for guiding the frame in a vertical path, upper and lower cross members rigidly connecting said uprights in spaced relation, a pair of horizontally extending frame members hingedly connected to said uprights for folding movement to a substantially vertical position, said hinged connection being offset forwardly with respect to the uprights and said frame members being disposed beneath said uprights in abutting relationship therewith whereby to provide a joint supporting the frame members in horizontal position, a cross member connecting said horizontal members, means for regulating the height of said seat supporting frame comprising a pair of ratchet mechanisms including rack members between said columns in fixed relation thereto, pawl members releasably engaging said racks, an actuating rod operatively associated with the pawls extending between and having bearing at respectively opposite ends in said uprights, and spring means pressing the pawl members into engagement with said racks, said lower cross member being engageable with the rack members to limit downward movement of the seat supporting frame, a seat frame having sliding engagement with said horizontal frame members and adjustably supported thereby, means whereby the seat is held in adjusted position in said frame members comprising a plurality of adjustment holes in the frame members and a pair of depending projections on the seat frame selectively engageable with the adjustment holes in the respective frame members, and a folding backrest having hinged connection with said seat frame, said hinged connection being offset forwardly and including associated bracket members having abutting relationship in normal upright position of the backrest whereby to support the backrest in operative position and provide for folding movement to inoperative position.

2. An adjustable and folding seat for rail vehicles comprising a pair of spaced columns secured to the vehicle and having vertical tracks providing guideways, a seat supporting frame including a pair of uprights disposed adjacent to said columns and having guide blocks projecting into said guideways for guiding the frame in a vertical path, cross members rigidly connecting said uprights in spaced relation, a pair of horizontally extending frame members hingedly connected to said uprights for folding movement to a substantially vertical position, said hinged connection being offset forwardly with respect to the uprights and said frame members being disposed beneath said uprights in abutting relationship therewith whereby to provide a joint supporting the frame members in horizontal position, a cross member connecting said horizontal members, means for regulating the height of said seat supporting frame comprising a pair of ratchet mechanisms including rack members between said columns in fixed relation thereto, pawl members releasably engaging said racks, an actuating rod operatively associated with the pawls extending between and having bearing at respectively opposite ends in said uprights, and spring means pressing the pawl members into engagement with said racks, a seat frame having sliding engagement with said horizontal frame members and adjustably supported thereby, means whereby the seat is held in adjusted position on said frame members comprising a plurality of adjustment holes in the frame members and a pair of depending projections on the seat frame selectively engageable with the adjustment holes in the respective frame members, and a folding backrest having hinged connection with said seat frame, said hinged connection being offset forwardly and including associated bracket members having abutting relationship in normal upright position of the backrest whereby to support the backrest in operative position and provide for folding movement to inoperative position.

3. An adjustable and folding seat for rail vehicles comprising a pair of spaced columns secured to the vehicle and having vertical tracks providing guideways, a seat supporting frame including a pair of uprights disposed adjacent to said columns and having guide blocks projecting into said guideways for guiding the frame in a vertical path, a pair of horizontally extending frame members hingedly connected to said uprights for folding movement to a substantially vertical position, said hinged connection being offset forwardly with respect to the uprights and said frame members being disposed beneath said uprights in abutting relationship therewith whereby to provide a joint supporting the frame members in horizontal position, means for regulating the height of said seat supporting frame comprising a pair of ratchet mechanisms including rack members between said columns in fixed relation thereto, pawl members releasably engaging said racks, an actuating rod operatively associated with the pawls extending between and having bearing at respectively opposite ends in said uprights, and spring means pressing the pawl members into engagement with said racks, a seat frame having sliding engagement with said horizontal frame members and adjustably supported thereby, means whereby the seat is held in adjusted position on said frame members comprising a plurality of adjustment holes in the frame members and a pair of depending projections on the seat frame selectively engageable with the adjustment holes in the respective frame members, and a folding backrest having hinged connection with said seat frame, said hinged connection being offset forwardly and including associated bracket members having abutting relationship in normal upright position of the backrest whereby to support the backrest in operative position and provide for folding movement to inoperative position.

4. An adjustable and folding seat for rail vehicles comprising a pair of spaced columns secured to the vehicle and having vertical tracks providing guideways, a seat supporting frame including a pair of uprights disposed adjacent to said columns and having guide blocks projecting into said guideways for guiding the frame in a vertical path, a pair of horizontally extending frame members hingedly connected to said uprights for folding movement to a substantially vertical position, said hinged connection being offset forwardly with respect to the uprights and said frame members being disposed beneath said uprights in abutting relationship therewith whereby to provide a joint supporting the frame members in horizontal position, means for regulating the height of said seat supporting frame comprising a pair of ratchet mechanisms including rack members between said columns in fixed relation thereto, pawl members releasably engaging said racks, an actuating rod operatively associated with the pawls extending between and having bearing at respectively opposite ends in said uprights, and spring means pressing the pawl members into engagement with said racks, a seat frame having sliding engagement with said horizontal frame members and adjustably supported thereby, means whereby the seat is held in adjusted position on said frame members, and a folding backrest having hinged connection with said seat frame, said hinged connection being offset forwardly and including associated bracket members having abutting relationship in normal upright position of the backrest whereby to support the backrest in operative position and provide for folding movement to inoperative position.

5. An adjustable and folding seat for rail vehicles comprising a pair of spaced columns secured to the vehicle and having vertical tracks providing guideways, a seat supporting frame including a pair of uprights disposed adjacent to said columns and having guide blocks projecting into said guideways for guiding the frame in a vertical path, a pair of horizontally extending frame members hingedly connected to said uprights for folding movement to a substantially vertical position, said hinged connection being offset forwardly with respect to the uprights and said frame members being disposed beneath said uprights in abutting relationship therewith whereby to provide a joint supporting the frame members in horizontal position, means for regulating the height of said seat supporting frame comprising a pair of ratchet mechanisms including rack members between said columns in fixed relation thereto, pawl members releasably engaging said racks, an actuating rod operatively associated with the pawls extending between and having bearing at respectively opposite ends in said uprights, and spring means pressing the pawl members into engagement with said racks, a seat frame having sliding engagement with said horizontal frame members and adjustably supported thereby, means whereby the seat is held in adjusted position on said frame members, and a folding backrest having hinged connection with said seat frame.

6. An adjustable and folding seat for rail vehicles comprising a pair of spaced columns secured to the vehicle and having vertical tracks providing guideways, a seat supporting frame including a pair of uprights disposed adjacent to said columns and having guide blocks projecting into said guideways for guiding the frame in a vertical path, a pair of horizontally extending frame members hingedly connected to said uprights for folding movement to a substantially vertical position, means for regulating the height of said seat supporting frame comprising a pair of ratchet mechanisms including rack members between said columns in fixed relation thereto, pawl members releasably engaging said racks, an actuating rod operatively associated with the pawls extending between and having bearing at respectively opposite ends in said uprights, and spring means pressing the pawl members into engagement with said racks, a seat frame having sliding engagement with said horizontal frame members and adjustably supported thereby, means whereby the seat is held in adjusted position on said frame members, and a folding backrest having hinged connection with said seat frame.

7. An adjustable and folding seat for rail vehicles comprising a pair of spaced columns secured to the vehicle and having vertical tracks providing guideways, a seat supporting frame including a pair of uprights disposed adjacent to said columns and having guide blocks projecting into said guideways for guiding the frame in a vertical path, a pair of horizontally extending frame members hingedly connected to said uprights for folding movement to a substantially vertical position, means for regulating the height of said seat supporting frame comprising a pair of ratchet mechanisms including rack members between said columns in fixed relation thereto, a pawl members releasably engaging said racks, an actuating rod operatively associated with the pawls extending between and having bearing at respectively opposite ends in said uprights, and spring means pressing the pawl members into engagement with said racks and a seat having sliding engagement with said horizontal frame members and adjustably supported thereby.

8. An adjustable and folding seat for rail vehicles comprising a pair of spaced columns secured to the vehicle and having vertical tracks providing guideways, a seat supporting frame including a pair of uprights having guide blocks projecting into said guideways for guiding the frame in a vertical path, a pair of horizontally extending frame members hingedly connected to said uprights for folding movements to a substantially vertical position, means for regulating the height of said seat supporting frame comprising a pair of ratchet mechanisms including rack members between said columns in fixed relation thereto and pawl members operatively carried by the supporting frame releasably engaging said racks, and a seat having sliding engagement with said horizontal frame members and adjustably supported thereby.

9. An adjustable folding seat for rail vehicles comprising a pair of spaced columns secured to the vehicle and having vertical tracks providing guideways, a seat supporting frame including a pair of uprights having guide blocks projecting into said guideways for guiding the frame in a vertical path, a pair of horizontally extending frame members hingedly connected to said uprights for folding movement to substantially vertical position, means for regulating the height of said seat supporting frame, and a seat having sliding engagement with said horizontal frame members and adjustably supported thereby, said seat having a backrest hingedly mounted on the horizontal frame members for folding movement thereon when said frame members are moved to vertical position.

CARL H. APEL.

REFERENCES CITED

The following references are of record in the file of this patent:

UNITED STATES PATENTS

| Number | Name | Date |
| --- | --- | --- |
| 303,002 | Groebl | Aug. 5, 1884 |
| 1,409,212 | Behr | Mar. 14, 1922 |
| 1,568,211 | Conwell | Jan. 5, 1926 |
| 1,952,744 | Chapman | Mar. 27, 1934 |
| 2,419,884 | Caughly | Apr. 29, 1947 |

FOREIGN PATENTS

| Number | Country | Date |
| --- | --- | --- |
| 495,630 | Great Britain | of 1938 |